United States Patent
Wilhelm et al.

(10) Patent No.: US 11,693,198 B2
(45) Date of Patent: Jul. 4, 2023

(54) OPTICAL FIBER PLUG CONNECTION AND ADJUSTMENT METHOD

(71) Applicant: CARL ZEISS MICROSCOPY GMBH, Jena (DE)

(72) Inventors: Stefan Wilhelm, Jena (DE); Thomas Mehner, Kleinromstedt (DE); Thomas Klos, Munich (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 0 days.

(21) Appl. No.: 17/445,919

(22) Filed: Aug. 25, 2021

(65) Prior Publication Data

US 2022/0066111 A1 Mar. 3, 2022

(30) Foreign Application Priority Data

Aug. 27, 2020 (DE) ...................... 10 2020 210 837.4

(51) Int. Cl.
*G02B 6/42* (2006.01)

(52) U.S. Cl.
CPC ......... *G02B 6/4292* (2013.01); *G02B 6/4206* (2013.01); *G02B 6/4226* (2013.01)

(58) Field of Classification Search
None
See application file for complete search history.

(56) References Cited

U.S. PATENT DOCUMENTS

| 6,276,843 B1 | 8/2001 | Alcock et al. |
| 8,622,624 B2 | 7/2014 | Bergann et al. |
| 11,118,896 B2 * | 9/2021 | Sesko ................ G02B 6/4206 |
| 2001/0046345 A1 | 11/2001 | Snyder et al. |
| 2002/0159685 A1 | 10/2002 | Cormack |
| 2010/0080563 A1 | 4/2010 | Difonzo et al. |
| 2017/0031110 A1 * | 2/2017 | Bhagavatula ........ G02B 6/3863 |

FOREIGN PATENT DOCUMENTS

| DE | 1961104 U | 6/1967 |
| DE | 102007051294 A1 | 1/2009 |

OTHER PUBLICATIONS

European Search Report for Application No. 21190184.8, dated Jan. 31, 2022, 9 pages.

* cited by examiner

*Primary Examiner* — Omar R Rojas
(74) *Attorney, Agent, or Firm* — Brake Hughes Bellermann LLP

(57) ABSTRACT

A fiber plug facilitates optical coupling of a light-guiding fiber to a plug receptacle and includes a plug housing for receiving and locking parts of the fiber plug in position relative to one another. The plug housing has: a fiber inlet and a fiber bearing for the spatially fixed reception of the fiber; optically downstream of the fiber bearing along a beam path, an optical lens for collecting light exiting at an end face of the light-guiding fiber and for collimating the collected light; and a coupling surface with an output of the beam path and with a coupling structure for connection to a receptacle structure that is complementary to the coupling structure. An adjustable optical element is arranged optically downstream of the fiber bearing in the beam path and has a first component of a magnetic coupling consisting of two components and a first component of a kinematic coupling.

17 Claims, 12 Drawing Sheets

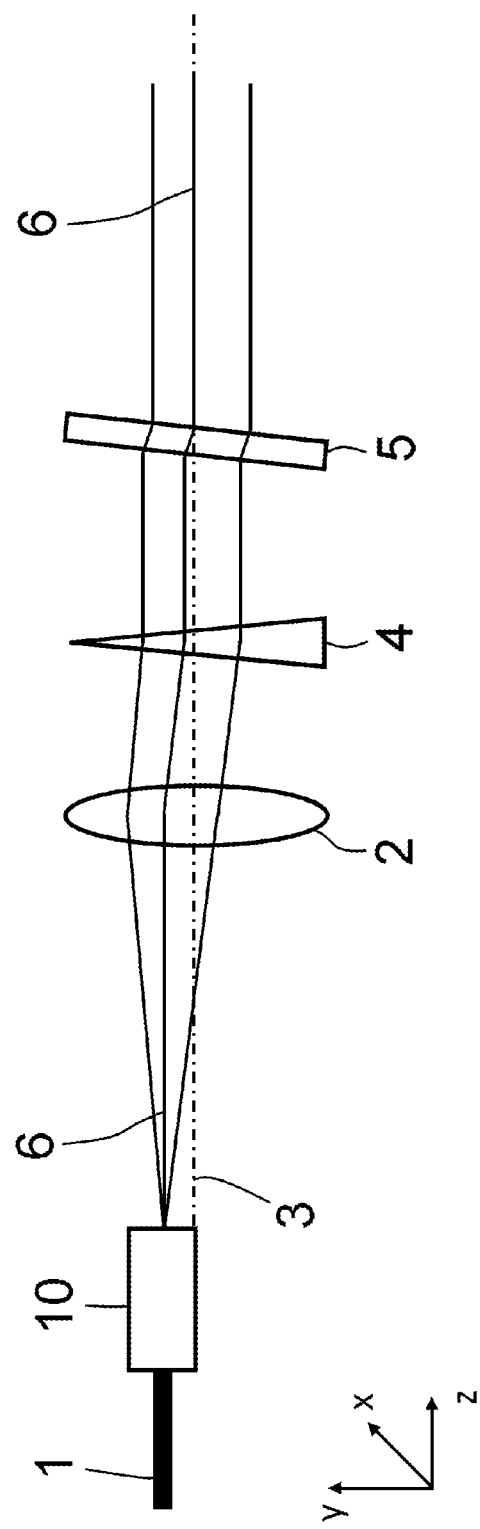

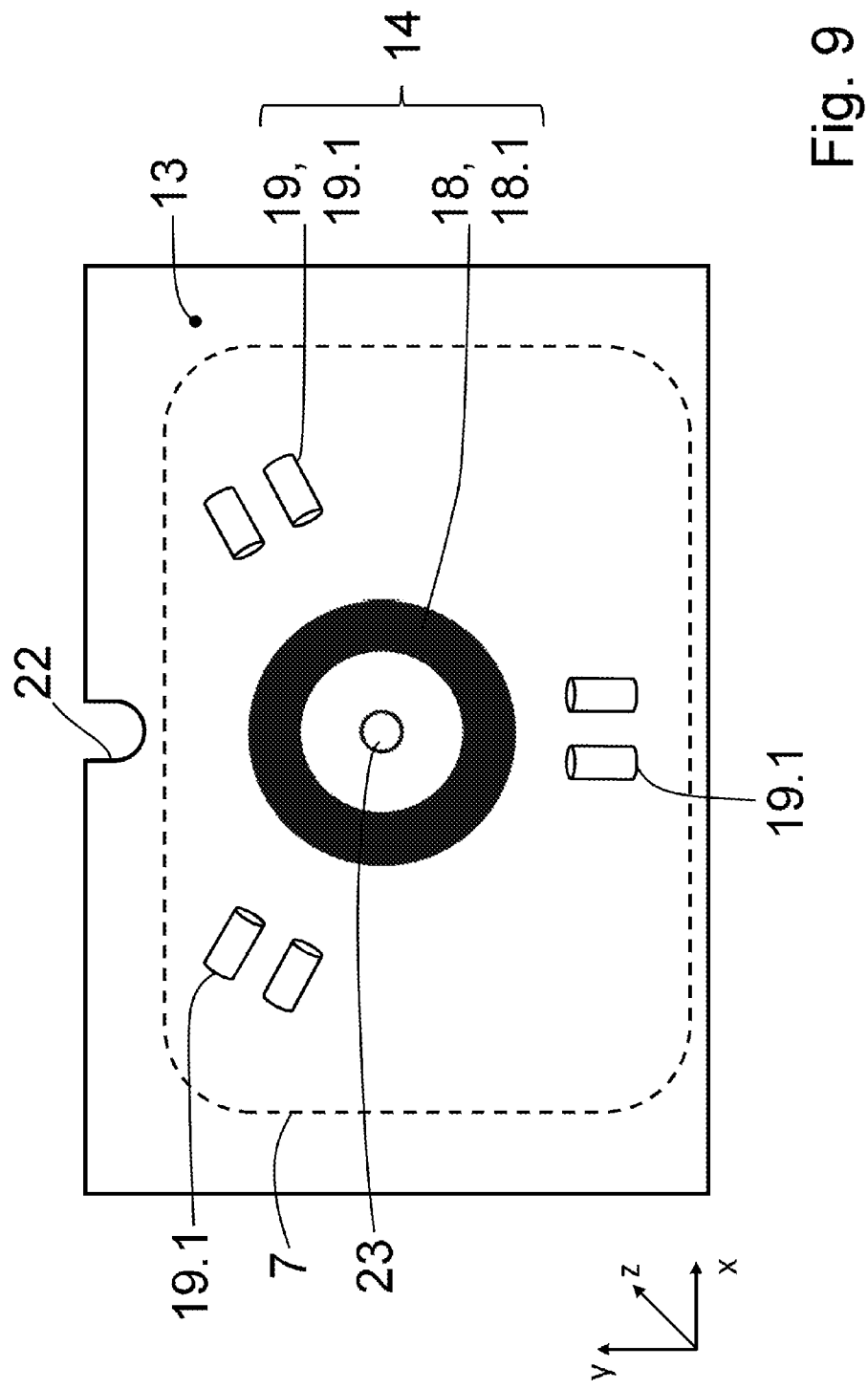

OPTICAL FIBER PLUG CONNECTION AND ADJUSTMENT METHOD

CROSS REFERENCE TO RELATED APPLICATION

This application claims priority to German Application No. 10 2020 210 837.4, filed Aug. 27, 2020, the disclosure of which is incorporated herein by reference in its entirety.

TECHNICAL FIELD

This disclosure relates to an optical fiber plug connection comprising a fiber plug and a plug receptacle and to a method for adjusting the fiber plug.

BACKGROUND

Modern imaging systems, in particular those for three-dimensional (3D) imaging in microscopy, require the radiation used for illumination to be coupled in in a positionally stable manner. Since a spatial decoupling of the light source and microscope system is often also useful, it has become established that the radiation is supplied by means of light-guiding fibers, for example by means of polarization-maintaining single-mode fibers. Adjustment-free pluggability of a polarization-maintaining single-mode fiber to any microscope systems is a great advantage with regard to flexible use and simplified maintenance.

A fiber plug connection with a plug and a socket is already known from DE 1 961 104 U. The plug is designed in that case in the form of a truncated cone and surrounds the light-guiding fiber at one end. The socket is correspondingly shaped to be complementary to the plug. The plug and/or the socket can consist of a ferromagnetic material or a magnetically influenceable material and attract each other. A centering of the plug and socket with respect to one another is achieved by a complex and very precise production of the surfaces of the plug connection that lie against one another.

In order to radiate laser light from a light-guiding fiber into another optical system, an optical plug connection for optical waveguides is suitable, for example, as is disclosed in DE 10 2007 051 294 A1. A plug of the plug connection has a plurality of plug parts, wherein one is used to receive an end of an optical waveguide which is held in a mount. Another one is provided with a lens, with a means for aligning and fixing the end of the optical waveguide along a beam direction, and with a means for aligning the lens transversely to an optical axis of the lens. A third plug part has at least one contact surface and is connected to the first and/or second plug part. A corresponding socket of the optical plug connection has a centering ring for aligning the plug in a plane perpendicular to the beam direction. A manual adjustment of the angle of the exiting beam is possible within limits by means of a lateral displacement of the fiber and the lens relative to one another. The final angular accuracy of the exiting collimated beam is achieved iteratively by machining four existing support feet. In other words, an individual adaptation of a plug to a socket takes place. The socket as a counterpart has a polished support surface that introduces only minor additional angular errors. The connection between plug and socket is achieved by a rotational movement of the plug and its placement against a polished surface. The plug is retained in place by a combination of projections and springs. Disadvantages are the wear that occurs due to the rotational connection movement and the complex and individual production with iterative optimization.

Other approaches, such as described in U.S. Pat. No. 6,276,843 B1, leave the adjustment elements permanently in the system. Since the collimation optical unit in the fiber cylinder cannot be adjusted relative to the fiber end, the location and angle must be readjusted when the fiber is changed in order to maintain the required accuracies.

SUMMARY

As disclosed herein, an improved optical fiber plug connection can be used multiple times without adjustment and can be produced more efficiently than the solutions according to the prior art. In addition, an improved adjustment method is disclosed.

The fiber plug is designed for the optical coupling of a light-guiding fiber to the plug receptacle and comprises a plug housing for receiving and locking components of the fiber plug in a predetermined position relative to one another. The plug housing has a fiber inlet and a fiber bearing for the spatially fixed reception of the light-guiding fiber. Optically downstream of the fiber bearing along a beam path is at least one optical lens for collecting light exiting at an end face of the light-guiding fiber and for collimating the collected light. In addition, a coupling surface with an output of the beam path and with a coupling structure for connection to a receptacle structure, which is complementary to the coupling structure, is present at the plug housing.

At least one adjustable optical element is arranged optically downstream of the fiber bearing in the beam path. If the optical lens in a possible embodiment of the fiber plug is likewise adjustable, the adjustable optical element is present in addition to the optical lens. The coupling structure of the fiber plug has a first component of a kinematic coupling and a first component of a magnetic coupling consisting of two components.

The beam path of the fiber plug is determined by a theoretical path provided by the construction of the fiber plug, along which light radiated from a fiber into the fiber plug travels up to an optical output of the fiber plug at the coupling surface. The beam path in this case is substantially determined by a virtual axis along which the optical axis of the finally adjusted optical lens is aligned.

The light transmitted by means of the light-guiding fiber is in particular laser light, which can optionally be polarized.

The kinematic coupling can be designed according to what is known as the Maxwell principle. For example, three V-shaped grooves are aligned with a common virtual intersection at an angular distance of 120° and combined with three matching curved support surfaces as counterparts. The kinematic coupling ensures that all six spatial degrees of freedom are defined. The corresponding elements are appropriately distributed over the fiber plug and plug receptacle. For manufacturing reasons, pairs of rods or half-rods with, for example, round, rounded or angular profiles can be used instead of the V-shaped grooves. The corresponding complementary counter-structures can, for example, be rods, semi-circular rods, spheres, or spherical segments. The rods, half-rods, spheres or spherical segments can consist, for example, of steel, a metal alloy, ceramic, or a correspondingly wear-resistant plastic. Other angular distances can also be selected in further embodiments. For example, the elements of the kinematic coupling can thus be arranged at an angle of 80° and two angles of in each case 140° with respect to one another. Other combinations of angles that add up to 360° are likewise possible. Instead of the V-shaped grooves, differently designed elements of the kinematic coupling can also be formed.

The magnetic coupling is implemented, for example, by means of at least one ring magnet as the first and/or second component. The ring magnet can surround the optical output of the beam path from the plug housing, in particular centrally and/or rotationally symmetrically. In this way, centering of the fiber plug, in particular of the output of the beam path, relative to the plug receptacle and a beam feedthrough present therein is advantageously achieved.

In further embodiments of the fiber plug, the first component of the magnetic coupling can be divided into a plurality of sections. The same applies to a plug receptacle (see exemplary embodiments). If the first and second components are designed as magnets, they are correspondingly arranged with opposite polarity with respect to each other. In alternative embodiments, the ring magnet or the sections of the ring magnet or magnets can be arranged asymmetrically around the output or around a passage in the plug receptacle. It is relevant here that the interaction of the first and the second component of the magnetic coupling results in a centering of the output of the fiber plug with respect to a passage of the plug receptacle via the elements of the kinematic coupling.

If only one of the components is a magnet, the corresponding other component contains a magnetically influenceable material. In a simple and efficient exemplary embodiment, the material is iron. In further embodiments, the material can be a ferrous alloy or a ferrous composite or plastic. The magnetically influenceable material can be present over an entire surface, divided into partial surfaces, and/or embedded in a carrier material. Embedding, for example, in a suitable plastic protects the material against undesired chemical reactions, for example corrosion.

The fiber plug, in interaction with a plug receptacle described further below, allows a self-centering and positionally stable plug connection. Individual mechanical adaptations can be dispensed with, even if different fiber plugs and plug receptacles are combined with one another. A twist-proof design ensures that an optical polarization axis remains unchanged and linearly polarized light is transmitted in a predetermined alignment. The centering and positioning of the positions of the fiber plug and plug receptacle with respect to one another is advantageously achieved by the kinematic coupling, while a required retaining force and likewise a centering is brought about by the effect of the magnetic coupling. An easily manageable, flexible, and reproducible production and use of a plug connection is thus possible without wear occurring. The embodiment of the optical plug connection secured against undesired rotation is achieved, for example, by the kinematic coupling.

If the components of the kinematic coupling are arranged asymmetrically in an alternative embodiment, for example not all at a 120° angle with respect to one another and/or with different radial distances, the fiber plug can be connected to the plug receptacle only in a single relative position. For example, such a design allows the definition and retention of the position of a polarization direction (oscillation plane of the E vector) when using linearly polarized light.

Precise and reproducible production of the plug connection allows for the adjustment freedom of the plug connection. In order to ensure that the position of the, in particular, collimated beam is precisely adjusted for each new plug-in operation, the fiber plug can have adjustable optical elements that remain in the adjusted state after a one-time adjustment. A readjustment for a later plug-in operation is therefore not necessary. Optionally, the adjustable optical elements can be permanently locked in the adjusted state.

As shown schematically in FIGS. 1a and 1b, substantially two errors are possible based on the adjustment of a fiber ferrule 10 of a light-guiding fiber 1 relative to the collimation optical unit 2 (optical lens 2). The fiber ferrule 10 or ferrule 10 encloses the end of the fiber 1 in a known manner. The end at which the light guided by the fiber 1 exits is arranged in a focal plane of the optical lens 2.

In the first possibility, the ferrule 10 does not sit or does not sit exactly on the optical axis 3 of the lens 2, but is directed parallel thereto (FIG. 1a). The end of the fiber 1 is not in the focal point but in the focal plane of the optical lens 2. Due to this parallel offset, an angular error occurs in the infinite beam path downstream of the optical lens 2.

If, on the other hand, the ferrule 10 is inclined relative to the optical axis 3 of the lens 2, i.e., if the radiation from the fiber 1 is incident obliquely on the optical lens 2, this leads to a spatial offset in the collimated beam downstream of the lens 2 (FIG. 1b). In the graphic illustration of this situation, the main ray is tilted, but has its origin in the focal point.

If the fiber end, i.e., the beam exit from the fiber 1, lies in the focal plane or in the focal point of the optical lens 2, the optical lens 2 brings about a collimated beam after the radiation has passed through the optical lens 2 (imaging to infinity/infinity beam; FIGS. 1a and 1b). Under this condition, the angle and spatial offset can be set separately from one another. The fiber plug therefore has at least one adjustable optical element by means of which the angular position and/or the spatial offset can be set.

The fiber is advantageously enclosed at its end by the ferrule, which in turn can optionally be surrounded by a sleeve and which is retained in the fiber plug, for example in a fiber bearing. The sleeve is, for example, a slotted ceramic tube that allows the ferrule to be clamped without pressure being exerted on the fiber. In order to reduce back reflections into the fiber, it can have a beveled cut of, for example, 8° at its end. Such a bevel must be taken into account when integrating the fiber. The fiber is advantageously provided with an apparatus for strain relief in order to hold the fiber securely in the fiber plug and achieve a permanently high reproducibility of the plug-in process and the light transmission.

In one possible embodiment of the fiber plug, the adjustable optical element is a prism wedge pair with two mutually adjustable prism wedges (known as a Risley pair; see, for example, U.S. Pat. No. 6,859,120 B2 and U.S. Pat. No. 4,515,447 A1, the disclosure of each of which is included herein by reference). The prism wedges are in that case rotatable independently of one another about an axis directed parallel to the optical axis. Additionally or alternatively, the prism wedges can be tiltable about a plurality of axes. The angle and the spatial offset can be set with the tiltable prism wedge pair.

In a further embodiment of the fiber plug, a pivot wedge pair can be present as an adjustable optical element for adjusting the beam path. The pivot wedge pair comprises two lenses whose side surfaces facing away from one another are designed as planar surfaces and that can be inclined and/or laterally displaced relative to one another. For example, one of the lenses is designed as a planoconcave lens and the other lens is designed as a planoconvex lens. The concave and convex side surfaces are advantageously adapted to one another in terms of their size and curvature, so that they engage into one another directly or with only a small gap between them and can nevertheless be moved, in particular tilted and/or displaced, relative to one another. In further embodiments of the fiber plug, the pivot wedge pair can be tilted and locked in its entirety.

In a further embodiment it is possible for at least one plane-parallel plate (plane plate, plate) to be arranged as the adjustable optical element. This plate can be inclined with respect to the beam path of the fiber plug about at least one axis and about a tilt angle. If this plane plate is located in the section with a divergent beam path, the angle is set as a result of the effect of the at least one plane plate. If, on the other hand, the plane plate is arranged in the section with a collimated beam path, the spatial offset is set as a result of a change in position, in particular a change in the inclination (tilt angle). It is particularly advantageous to design the plane plate in the form of a spherical base body with two side surfaces that are parallel to one another (for example U.S. Pat. No. 8,254,735 B2; "window ball"). Spatial offsets can be corrected in two lateral degrees of freedom by tilting about two axes orthogonal to the beam path.

For the embodiment described above, it is possible that a further plane-parallel plate and/or additionally a pair of mutually adjustable prism wedges is or are arranged in the beam path. If at least one plane plate and one prism wedge or a prism wedge pair (rotary wedge pair with identical wedge angles) is/are present, the setting of the spatial offset and the angle is possible. Two or more plane plates allow a more variable reaction to the current angles or spatial offsets. If, for example, two plane plates are used, these are arranged with mutually opposite tilt angles or they can be set with the corresponding tilt angles.

In further possible embodiments of the fiber plug, the plane plate or the plane plates can be dispensed with if the prism wedge pair already mentioned is arranged in a common mount that allows the adjusted wedges to additionally be tilted in two axes in order to achieve a parallel offset of the beam. If the jointly held prism wedge pair (rotary wedge pair) is located in the region of a collimated beam path, the prism wedges are brought into what is known as a zero position (see also FIG. 7b), in which the optical effects of the two prism wedges cancel each other out. In this way, if the jointly held prism wedge pair is tilted, an optical effect corresponding to the tilting of a plane plate is achieved. The spatial offset can then be set by tilting the held prism wedge pair that is in the zero position, and the prism wedge pair can be fixed in this tilted position. The extent of the tilt depends, among other things, on the alignment of the planar surfaces, namely either facing one another or facing away from one another, and on the wedge angle of the prism wedges.

If prism wedges or prism wedge pairs are used, chromatic correction of the prism wedges is required in the case of an intended use of the optical plug connection over a broad wavelength range, in particular the visible range (VIS, approx. 400-700 nm, preferably up to 645 nm; in further versions up to 800 nm). For this purpose, materials are suitably combined with regard to their refractive indices and Abbe numbers (dispersion properties), wherein the prism angle is adapted to the refractive index in order to achieve a suitable overall deflection with sufficient sensitivity at the same time. A suitable glass combination for an achromatic prism is, for example, N-FK5 and F2 (both from SCHOTT ADVANCED OPTICS).

The optical lens and, if present, the lenses of the pivot wedge pair can likewise be chromatically corrected with regard to the wavelengths intended for use. In a further configuration of the fiber plug, the prism wedges can be dispensed with if the optical lens can be adjusted orthogonally to the beam path (x-direction or y-direction) in addition to a shift along the beam path (z-direction) and the optical lens can additionally be tilted about axes in the x-direction and in the y-direction in relation to the beam path (tilt angle Phix and Phiy, respectively). In this embodiment, there is at least one plane plate in the beam path which is used to correct any residual errors. This configuration only needs a minimal number of optical elements.

A light-guiding fiber can be inserted and held in the fiber bearing. A light exit surface of the fiber is directed in this case along the beam path, which means that the optical axis or longitudinal axis of the fiber is directed along the beam path of the fiber plug. Angular errors and/or spatial offsets can also occur here, which can be corrected, or have already been corrected, by a corresponding adjustment of the at least one adjustable optical element. The fiber received in the fiber bearing can be held with a clamping element present in the fiber bearing.

In a finally adjusted state of the fiber plug, the adjustable optical elements are adjusted such that light exiting the fiber is provided or can be provided at the optical output of the fiber plug parallel and symmetrically with respect to the beam path. The adjusted beam is centered in relation to the kinematic coupling with the result that, when the plug connection between the fiber plug and the plug receptacle is established, the light beam is always radiated, or can be radiated, in an intended alignment, and in the case of polarized light, possibly in a correct rotational position, from the fiber plug into an optical apparatus carrying the plug receptacle. In order to maintain this adjusted state, the adjustable optical elements can be permanently locked in that adjusted state. Such non-releasable locking can be effected, for example, by gluing, potting, soldering, or welding the adjustable optical elements and optionally the optical lens.

The abovementioned plug receptacle for connection to the fiber plug is characterized by a second component of the kinematic coupling, which is designed to be complementary to the first component of the kinematic coupling, as a receptacle structure. Additionally present is a second component of the magnetic coupling consisting of two components. Since the plug receptacle is advantageously designed to be substantially planar or plate-shaped, at least in the region of the receptacle structure and the second component of the magnetic coupling, the designation socket or plug socket is not used.

The complementary design of the kinematic coupling ensures a correct relative position of the fiber plug and plug receptacle. The magnetic coupling creates the required retaining forces without this requiring mechanical components.

The fiber plug and plug receptacle may be secured by mechanical means, for example by means of a force-free screw connection or a securing clip, merely in order to avoid inadvertent interruption of the plug connection.

In a further embodiment of the plug receptacle, an adjustable plane-parallel plate is arranged in its beam path. With such a plug receptacle, the required tolerance for the beam position of the fiber plug or the plug connection can be further selected. The plane-parallel plate in the plug receptacle can be adjusted comparatively easily. The plug receptacle that has been designed in this way can be combined with all the above-described embodiments of the fiber plug.

An optical plug connection comprises a fiber plug in one of the embodiments described above and a plug receptacle.

The object is additionally achieved by a method for adjusting a fiber plug, wherein a fiber plug with a fiber inserted and aligned in the fiber bearing is used.

The method comprises aligning the fiber plug and its beam path relative to a reference mark or to an external adjustment apparatus. The reference mark or the adjustment apparatus is subsequently illuminated with light from the fiber plug. The adjustable optical elements are then adjusted until light exiting the fiber is provided at the optical output of the plug housing parallel and symmetrically with respect to the beam path. For this purpose, in one configuration of the method, the optical lens acting as a collimator can be shifted in the direction of the beam path in order to set the beam propagation. The beam angle can be adjusted by shifting the optical lens transversely to the beam path. The adjustment can take place, for example, with a measurement system such as a focusable autocollimation telescope (FAKF; combination of alignment telescope and (auto-) collimation telescope), which is focused accordingly in each case in order to adjust the location or angle. Alternatively, the adjustment can be carried out using two separate beam paths with reference marks for location and angle and correspondingly adapted optical units arranged upstream. When the adjusted state of the adjustable optical elements in the fiber plug is achieved, they are locked. Optionally, the adjustable optical elements can be non-releasably locked in the adjusted state, for example by gluing, soldering, welding or potting. In addition, the optical lens, especially if it is designed to be adjustable, and optionally the ferrule, can be non-releasably locked in the fiber bearing.

The result is a monolithic fiber plug, which can be plugged already adjusted to different plug receptacles without having to be adjusted again. The correct beam position is permanently ensured by the described adjustment method and the fixing of the components of the fiber plug. The correct alignment of the fiber plug relative to the plug receptacle is achieved through the combination of kinematic and magnetic coupling. In this way, the interaction of the technical measures in the fiber plug and the measures for reproducible creation of the plug connection by means of the two couplings brings about an optical plug connection that can be established between any fiber plugs and plug receptacles in an adjustment-free and reproducible manner.

The advantages of the disclosed optical plug connection and the disclosed adjustment method can manifest, for example, in an increased stability of the coupling against environmental influences overall and in reduced outlay and thus costs for the installation, maintenance and upkeep of the systems. In particular, no complex readjustments of the beam position are necessary. In addition, screwing the components and the permanent integration of adjustment aids in the fiber plug and in the plug receptacle can advantageously be dispensed with. The repeatability of the plug connection is ideal due to the complete kinematic definition. It ensures minimal deviations in both the spatial position and in the solid angle. Due to the symmetry of the arrangement, there is additionally a homogeneous expansion in the case of temperature changes, so that such a system has optimal stability properties at fluctuating ambient temperatures. Since the individual plugs must not exceed a specific limit value with regard to the plug repeatability, the beam position, and the beam angles, the individual plugs are actively adjusted against a common external reference. Furthermore, the self-centering properties of the kinematic coupling are optimally used through the fixation via a central ring magnet, so that real plug & play is possible. The accuracy in the angle and location is not present only after a screw connection or a clamping of the components of the plug connection, but instantaneously via the plug-in operation.

Techniques described herein simplify the adjustment method and the solution becomes significantly more cost-effective in terms of production times. In addition, assembly and/or adjustment can be partially or fully automated. In addition to the required precision, the proposed solution is particularly low-wear.

For example, for the purpose of reproducible output coupling and coupling of light from a single mode fiber to a device system, for example to a microscope or to an interface of a microscope, the invention can furthermore be connected to and used with the latter. The microscope can be, for example, a light sheet microscope, a confocal, a confocal-scanning, or a widefield microscope. Other known uses, as necessary while observing high precision requirements, are the coupling of a free beam into a single mode or multimode fiber. Here, too, both the angle and the beam position must be corrected in a stable manner. In such an embodiment, a socket can additionally be present, by means of which active positioning relative to the free beam is made possible. For example, use with a fiber that is fixedly mounted to a microscope and an adjustment-free plug-in on the side of the light source is also possible.

BRIEF DESCRIPTION OF THE DRAWINGS

The invention is explained in more detail below on the basis of exemplary embodiments and figures. In the figures:

FIG. 2 shows a schematic illustration of a first exemplary embodiment of an optical plug connection with a fiber plug and with adjustable optical elements in the infinite beam path;

FIG. 9 shows a schematic illustration of an exemplary embodiment of a coupling surface of the plug housing of a fiber plug with first components of a kinematic coupling and with a first component of a magnetic coupling;

DETAILED DESCRIPTION

The exemplary embodiments shown in FIGS. 2 to 9 are schematic illustrations. The reference signs denote the same technical elements in each case.

FIG. 2 shows an arrangement of a plurality of optical elements in a beam path 6 as an example. In addition, the resulting corrective effect of these optical elements is illustrated.

Figure 1A:
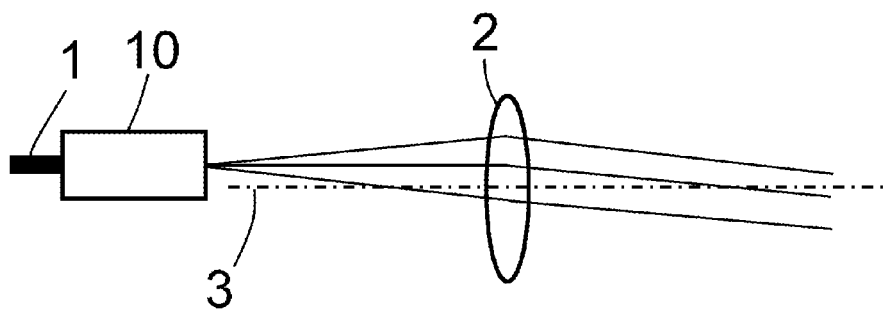
FIG. 1a shows a schematic illustration of a resulting angular error.

The fiber 1 held in the ferrule 10 is aligned parallel to but offset from the optical axis 3. The beam path 6 and the optical axis 3 do not coincide in this section, i.e., the beam path 6 extends parallel to the optical axis 3 with an offset. Without correction, a resulting angular error of the collimated beam would occur, as is shown in FIG. 1a. The light exiting at the end face of the fiber 1 diverges and is incident on the optical lens 2, which functions as a collimation optical unit. The light is collimated by the effect of the optical lens 2 and reaches an optical wedge or prism wedge 4 at an angle to the optical axis 3. With regard to its optical properties, in particular with regard to its refractive properties, and also its relative position in the beam path 6, the wedge is designed or arranged in such a way that the rays of the light run parallel to the optical axis 3 after they have passed through the prism wedge 4. As can be seen in particular from the central ray, there may still be a spatial offset. This is corrected by a plane plate 5 that is likewise located in the beam path 6. The plane plate 5 is inclined relative to the optical axis 3 in accordance with the spatial offset that is to be corrected and taking into account its optical properties. As a result, after leaving the plane plate 5, the rays of the light have no angular error and no spatial offset with respect to the plane of the drawing. The beam path 6 and the optical axis 3 extend symmetrically with respect to one another and in the example coincide after the plane plate 5. The beam path 6 is now aligned along the optical axis 3. The light corrected in this way can be made available at an interface 17 (see FIGS. 3 to 6) for further use. In order to achieve the desired corrective effect, the prism wedge 4 and the plane plate 5 can be adjustable, for example they are rotatable or tiltable.

Figure 3:
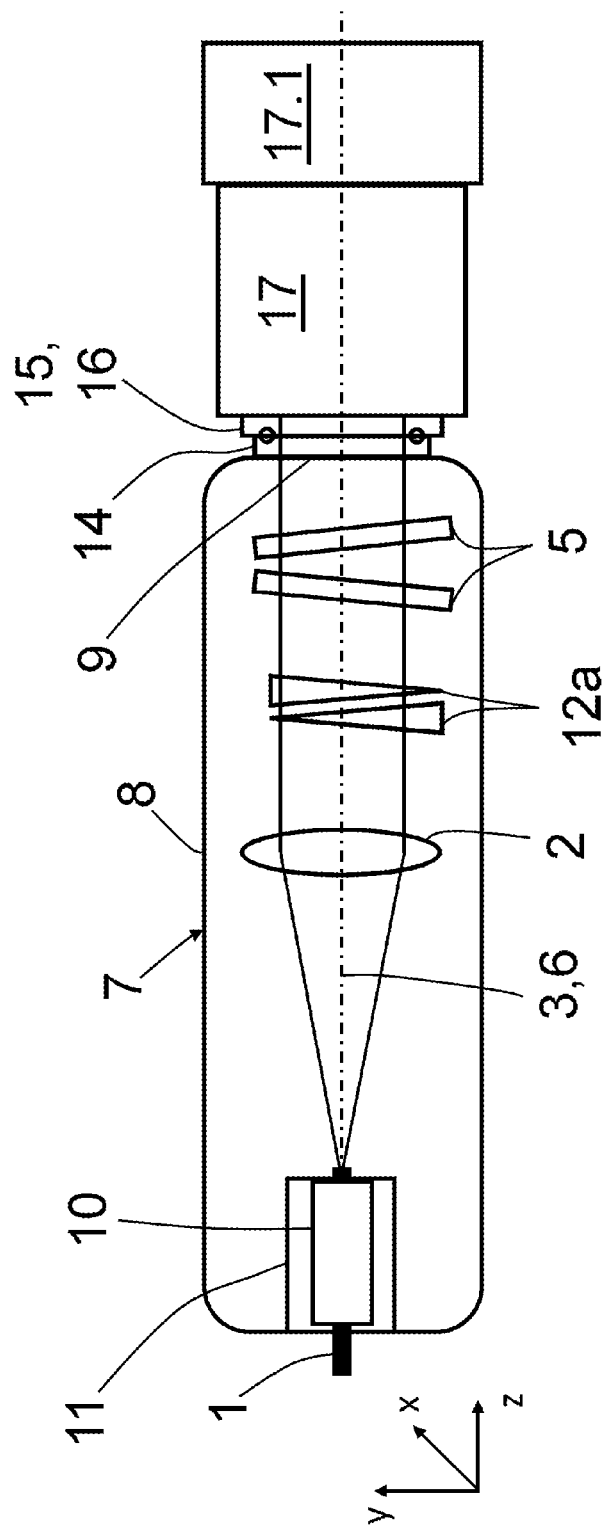
FIG. 3 shows a schematic illustration of a second exemplary embodiment of an optical plug connection with a fiber plug and with adjustable optical elements in the infinite beam path, and also a schematic illustration of the interface to a microscope.

The principle shown in FIG. 2 is implemented in a first exemplary embodiment of an optical plug connection in FIG. 3.

A fiber plug 7 comprises a plug housing 8 with a fiber bearing 11 in which the fiber 1 is inserted. The radiated light is emitted from the fiber plug 7 at an output 9 of the plug housing 8. The fiber held by the ferrule 10 is retained in a fixed location in the fiber bearing 11. After a section of the beam path 6 with diverging rays of the light, the light is incident on the optical lens 2 and is corrected with regard to the angular error and the spatial offset by the effect of the adjustable optical elements downstream in the beam path 6. For the sake of simplicity, the beam path is divided into a section with diverging light beams and a section with collimated light beams.

Figure 4:
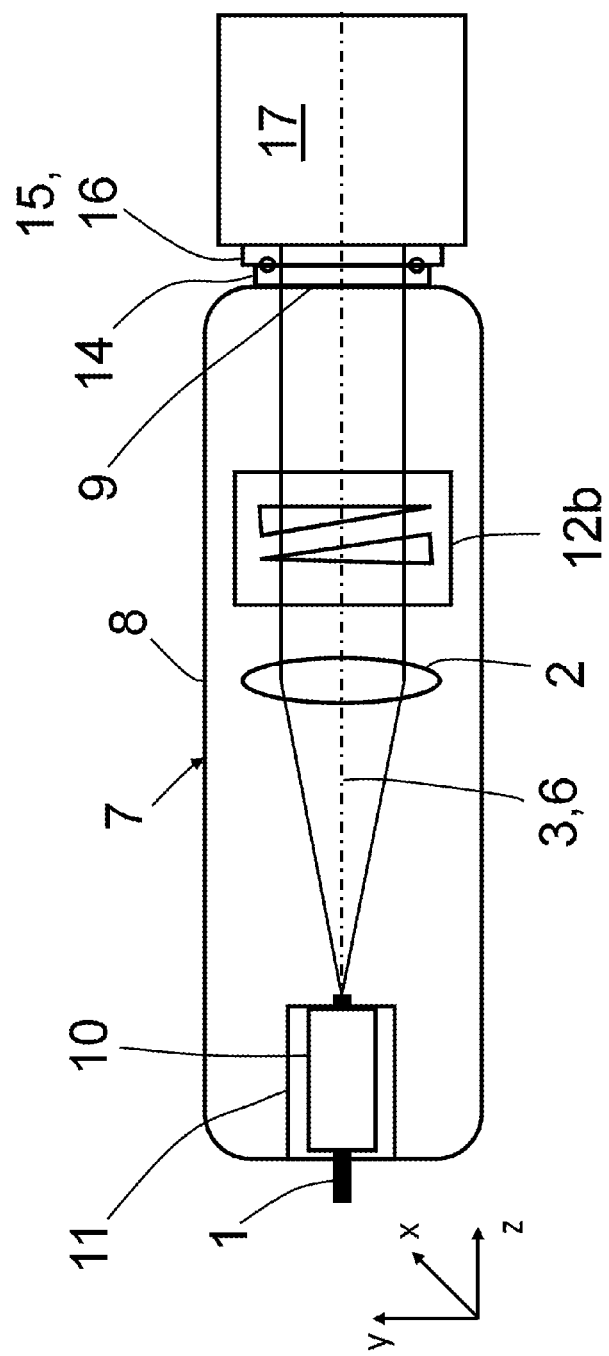
FIG. 4 shows a schematic illustration of a third exemplary embodiment of an optical plug connection with a fiber plug and with adjustable optical elements in the infinite beam path.

In the exemplary embodiments shown in FIGS. 3 and 4, the beam manipulation or the correction takes place entirely in the infinite beam, that is to say in the section of the beam path 6 with collimated light rays. In the first exemplary embodiment shown in FIG. 3, a prism wedge pair 12a with mutually adjustable prism wedges is present instead of an individual prism wedge 4 (see FIG. 2). Two independently adjustable plane plates 5 (tiltable about the x-axis and/or about the y-axis) are present in the beam path 6 downstream of the prism wedges. The collimated light is passed at the output 9 to an interface 17, for example of a microscope 17.1. A coupling structure 14 is present in the region of a coupling surface 13, located at the output 9 (see FIGS. 7a, 7b, 8a, and 8b), of the plug housing 8. The former interacts with a receptacle structure 15 of a plug receptacle 16. In the example, the angle is set via the prism wedge pair 12a and the location is set to the respective target values via the pair of plane plates 5.

The plane plates 5 can be dispensed with (FIG. 4) if the pair of prism wedges (prism wedge pair 12b) is arranged in a common mount (symbolized by a common frame), which allows the adjusted wedges to be additionally tilted about two axes (x and y) in order to set a parallel offset of the beam and to be able to correct a spatial offset. The side surfaces of the jointly held prism wedge pair 12b pointing outward in each case, away from the respective other prism wedge, extend in the illustrated starting position of the prism wedge pair 12b orthogonally to the optical axis 3 in an xy plane.

Figure 5:
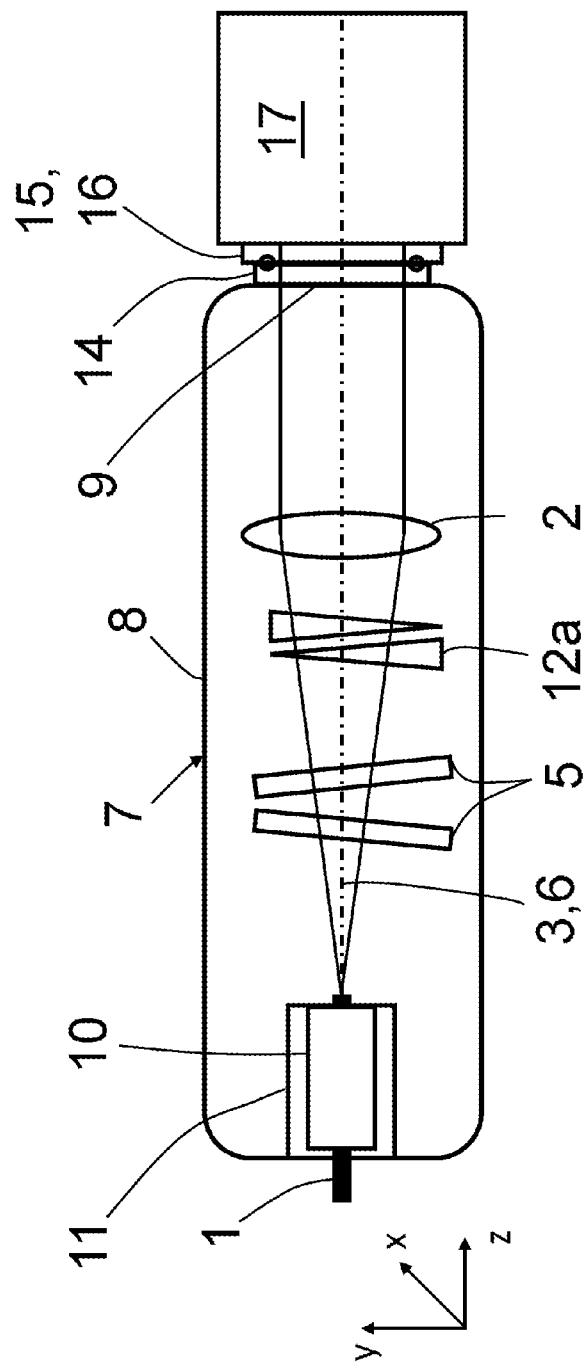
FIG. 5 shows a schematic illustration of a fourth exemplary embodiment of an optical plug connection with a fiber plug and with adjustable optical elements in a divergent section of the beam path.

In a fourth exemplary embodiment of the optical plug connection, the adjustable optical elements (adjustment means) are arranged in the divergent section of the beam path 6 (FIG. 5). In contrast to the second and third exemplary embodiments, the plane plates 5 are used to set the angle and the prism wedge pair 12a is used to adjust the spatial offset in relation to the collimated beam. Due to the increased space requirement and the resulting longer focal length of the collimation optical unit 2 and the associated larger beam diameter, the requirements for the interface 17 in the microscope change and the space required for the fiber plug 7 increases. In order to enable the longer focal length of the collimation optical unit 2, a magnifying telescope may be omitted in the subsequent optical system. At the same time, the requirements for the positioning accuracy of the collimation optical unit 2 and for the accuracy of the mechanical interface, that is to say for the kinematic coupling 19, in particular with regard to the angle requirements to be observed, increase. The beam diameter required in the subsequent optical system (microscope) is correspondingly already implemented, entirely or partially, at the output of the fiber plug.

Since the focal length 1:1 is included in the adjustment sensitivity of the optical lens 2 with respect to the fiber ferrule 10, the use of a collimation optical unit 2 with the shortest possible focal length is advantageous for a manageable sensitivity of the adjustment. The corresponding post-enlargement to the necessary beam diameter in the subsequent optical system of the microscope, for example by means of a corresponding telescope, additionally favors the angular sensitivity of the interface 17 per se. With a typical NA of the fiber of <=0.1 in connection with an approximately 6-fold post-enlargement, for example, a good compromise is given with a collimation to a beam diameter in the range of 0.7 mm. For this purpose, the collimation optical unit has, for example, a focal length between 4 mm and 6 mm.

Figure 6:
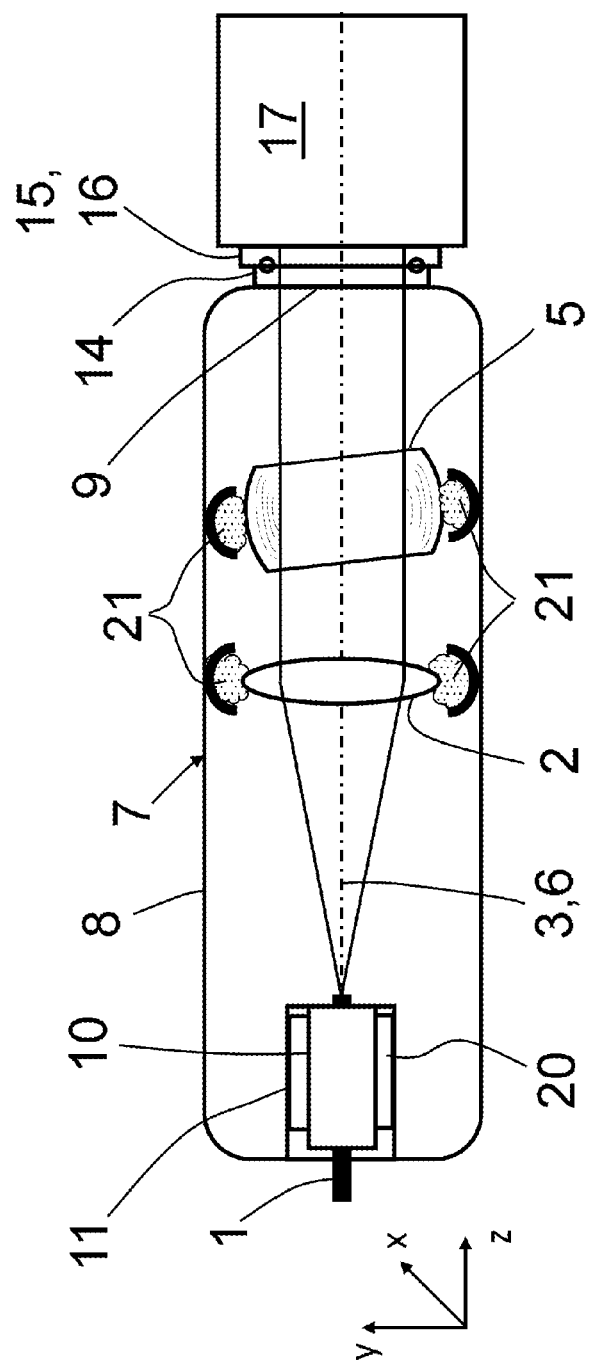
FIG. 6 shows a schematic illustration of a fifth exemplary embodiment of an optical plug connection with a fiber plug and with adjustable optical elements in a diverging section of the beam path and in the infinite beam path.

In a fifth exemplary embodiment of the optical plug connection, the optical lens 2 is designed to be adjustable (FIG. 6). A plane plate 5, which is likewise adjustable, is present in the collimated section of the beam path 6, wherein the former is designed in the form of what is known as a "window ball". The curved lateral surface facing the viewer is symbolized by bow lines. An alternative is provided by two plane plates 5 with tilt axes that are perpendicular to one another (around the x-axis or around the y-axis; not shown).

To adjust the beam position, the lens 2 is positioned using external adjustment aids (see FIG. 9) in all degrees of freedom with respect to the beam coming from the fiber 1 in a manner such that a collimated beam at the output 9 of the fiber plug 7 opposite the coupling surface 13 (see FIGS. 7a, 7b, 8a, and 8b) exits with precise location and angle. The ferrule 10 can be releasably locked in the fiber bearing 11 by means of a clamping element 20. The position setting of the plane plate 5 results in an optimization of the lateral alignment or an optimization of the centering of the beam path 6 with respect to the optical axis 3.

Depending on the wavelength range of the exiting laser radiation, the optical lens 2 acting as a collimation lens is designed to be corrected simply, chromatically or achromatically. The long-term stability of the transmission of short-wave laser radiation at 405 nm must be taken into account in the chromatic and achromatic variants, as required, by means of a correspondingly stable cement layer or a cement-free embodiment.

Figure 7A:
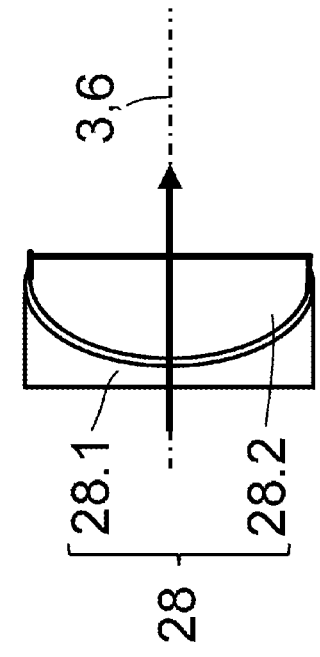
FIG. 7a shows a schematic illustration of a zero position of two mutually adjustable prism wedges and the resulting optical effect.
Figure 7B:
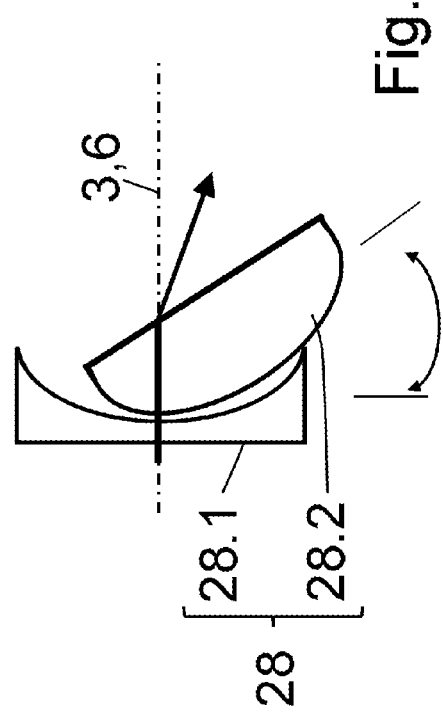
FIG. 7b shows a schematic illustration of two mutually adjusted prism wedges and the resulting optical effect.

The operation of two mutually adjustable prism wedges of a prism wedge pair 12a is shown schematically and by way of example in FIGS. 7a and 7b. In a first relative position, the prism wedges are rotated by 180° relative to one another in a zero position. In this zero position, a light ray (arrow) passes along the optical axis 3 or the beam path 6 through the prism wedge pair 12a. In the further relative position according to FIG. 7b, the light ray is deflected downward at a defined angle in the plane of the drawing.

Figure 8A:
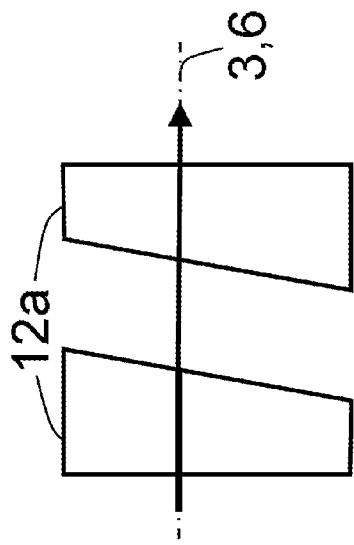
FIG. 8a shows a schematic illustration of a pair of pivot wedges in the zero position and the resulting optical effect.

FIG. 8a shows a pivot wedge pair 28 comprising the lenses 28.1 and 28.2. The first lens 28.1 is designed as a plano-concave lens, while the second lens 28.2 is designed as a plano-convex lens. The planar side surfaces of the lenses 28.1 and 28.2 face away from each other so that the planar side surfaces point outward and extend orthogonally to the optical axis 3 or to the beam path 6 in the zero position of the pivot wedge pair 28 shown in FIG. 8a. The optical effect of the pivot wedge pair 28 in the zero position consists in the fact that a light ray that is incident perpendicularly, in particular centrally, on a planar side surface passes through the pivot wedge pair 28 without lateral deflection. In order to substantially reduce the effect of the pivot wedge pair 28 on the collimated beam, the focal lengths of the lenses 28.1 and 28.2 are large and are, for example, 1 m.

Figure 8B:
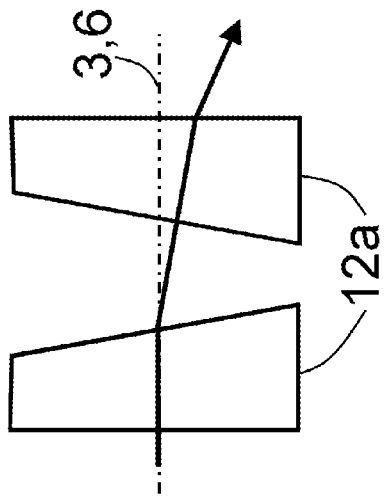
FIG. 8b shows a schematic illustration of the pair of pivot wedges in a pivoted state and the resulting optical effect.

The convex and concave side surfaces are matched to one another in terms of their dimensions and radii such that they can be laterally displaced relative to one another. In FIG. 8b, the lens 28.2 provided with a convex side surface is displaced laterally against the first lens 28.1. The incident light ray is deflected from its original direction of propagation.

The lateral displacement of one or both lenses 28.1, 28.2 of the pivot wedge pair 28 takes place, for example, by means of a controlled drive (not shown). The associated control commands can be generated by an evaluation unit 25 and be implemented by an actuating apparatus 26 (see, for example, FIG. 12).

The pivot wedge pair 28 can optionally also be tilted as a whole about the x-axis and/or about the y-axis. The relative position of the lenses 28.1 and 28.2 in this case can be kept constant so that, for example, the optical effect of a plane plate is achieved. Optionally, the pivot wedge pair 28 can be displaced along the z-axis.

An embodiment of the coupling surface 13 of the fiber plug 7 (indicated by a broken solid line) is shown in FIG. 9 in a plan view in the z-direction. The connection of an optical plug connection is achieved by the effect of a magnetic coupling 18 and a kinematic coupling 19.

A ring magnet is present as a first component 18.1 of the magnetic coupling 18 on the coupling surface 13 or is embedded therein partially or flush therewith. The ring magnet rotationally symmetrically surrounds a passage 23 serving as the output 9 of the fiber plug 7. First components 19.1 of the kinematic coupling 19 are provided offset from one another by 120° in each case. In the exemplary embodiment, these are formed by pairs of rods that are parallel to one another and at a distance from one another. In further possible embodiments, the angles between the first components 19.1 and/or their design can be selected differently.

A recess 22 enables a force-free screw connection of the fiber plug 7 as a safeguard against unintentional interruption of the plug connection.

Figure 10:
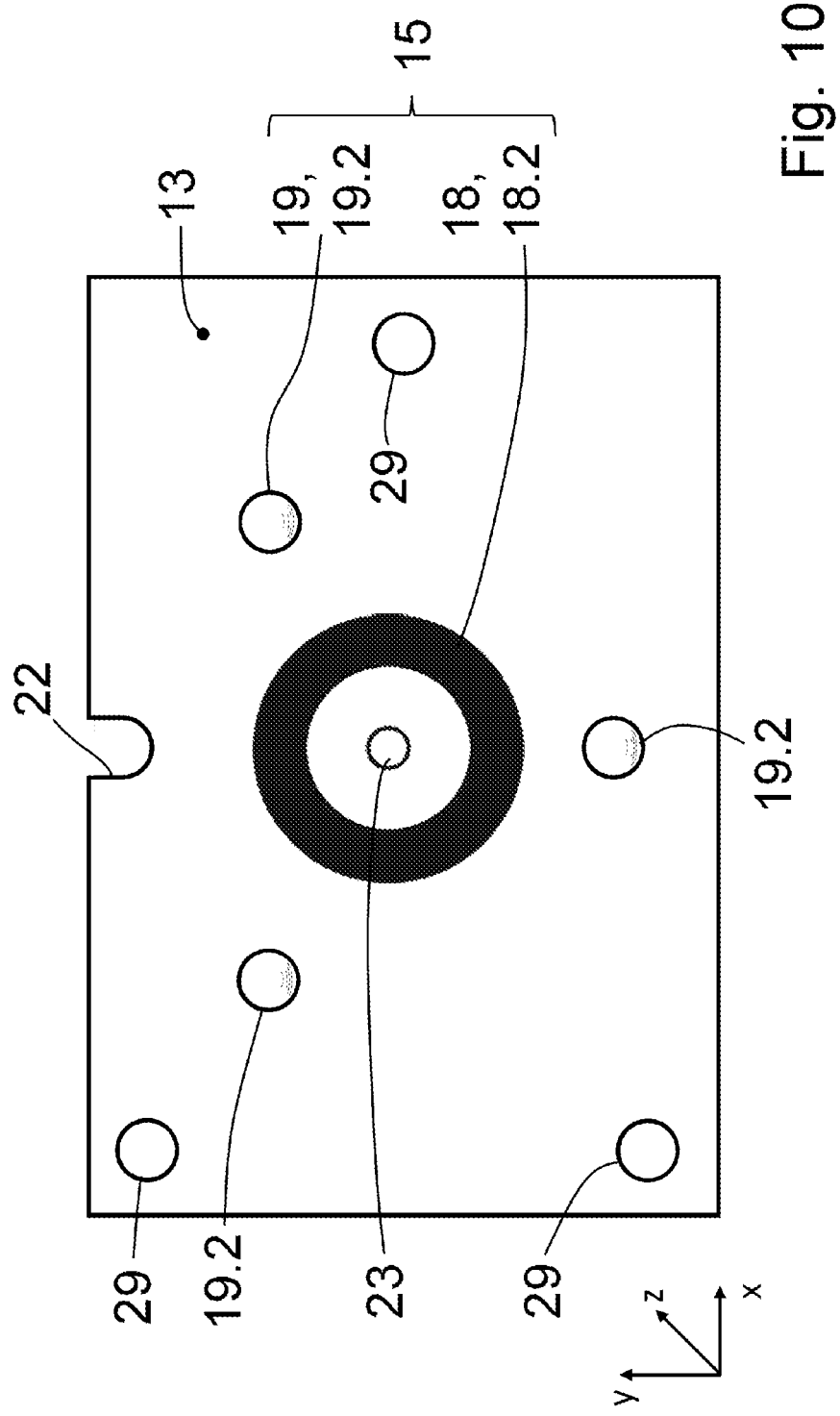
FIG. 10 shows a schematic illustration of an exemplary embodiment of a plug receptacle with second components of a kinematic coupling and with a second component of a magnetic coupling.

A receptacle structure 15 of the plug receptacle 16 that is compatible with the coupling structure 14 has three spherically protruding second components 19.2 of the kinematic coupling 19 (FIG. 10). These are compatible with the first components 19.1 of the kinematic coupling 19 in terms of their dimensions and positioning. A second component 18.2 of the magnetic coupling 18 is provided symmetrically around a passage 23, the polarity of which with regard to its magnetization is opposite to that of the first component 18.1. The second component 18.2 is compatible with the first component 18.1 in terms of its dimensions and positioning. Fastening holes 29 are additionally shown.

Figure 11:
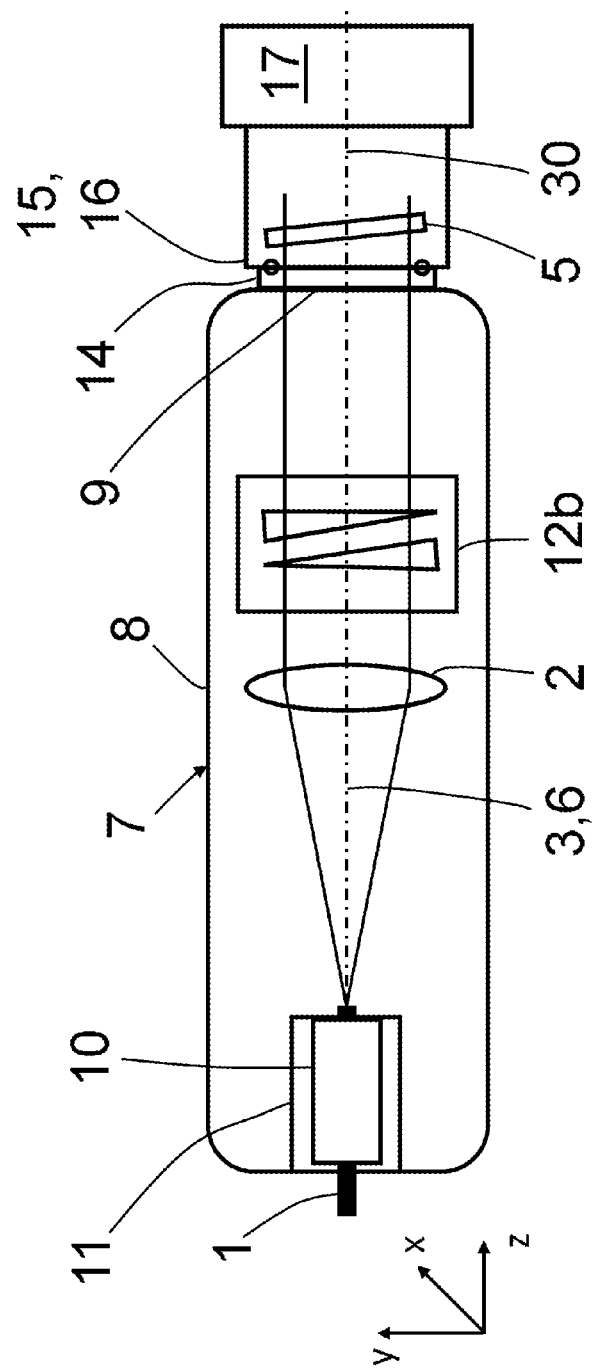
FIG. 11 shows a schematic illustration of a sixth exemplary embodiment of an optical plug connection with a fiber plug and with adjustable optical elements in the infinite beam path and with a plane-parallel plate in the beam path of the plug receptacle.

The plug receptacle 16 can have at least one adjustable plane-parallel plate 5 in its beam path 30 (FIG. 11). The possibility of adjusting this plate 5 allows the tolerances to be observed for the beam position of the fiber plug 7 to be more broadly defined than is the case with the previous exemplary embodiments.

Figure 12:
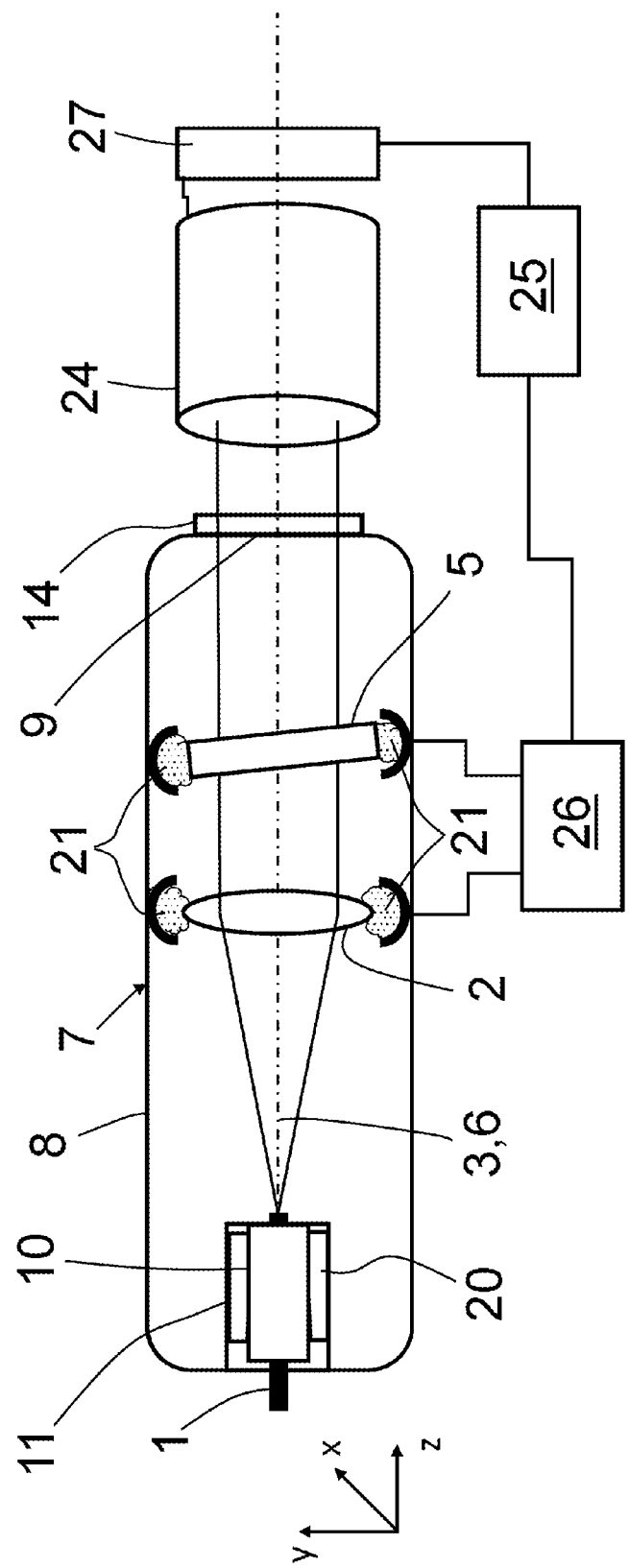
FIG. 12 shows a schematic illustration of an arrangement for adjusting a fiber plug.

The method for adjusting a fiber plug 7 is shown schematically in FIG. 12 on the basis of a fiber plug 7 according to the fifth exemplary embodiment of the optical plug connection (FIG. 6). For the adjustment, the fiber 1 with the ferrule 10 is inserted into the fiber bearing 11. Light is coupled into the fiber 1 and exits at the end face of the fiber 1 located in the fiber plug 7. The fiber plug 7 or its beam path 6 is aligned with an adjustment apparatus 24, and the latter is illuminated with the light exiting the fiber plug 7. The adjustment apparatus 24 can be an autocollimation telescope (AKF) which can be set to two different focal positions and thus combines the functions of both an AKF for angle measurement and an alignment telescope for location determination. For example, the focal length of the AKF can lie in a range of 400 mm in order to achieve a high accuracy of less than or equal to one arc second ($\leq 1"$) in the angle measurement.

For the purpose of adjustment, the beam path 6 of the fiber plug 7 is made to coincide with the optical axis of the adjustment apparatus 24. The adjustable optical elements, in this exemplary embodiment the optical lens 2 and the plane plate 5, are subsequently adjusted in a manner such that the light at the optical output 9 is collimated and exits the fiber plug 7 parallel and symmetrically with respect to the beam path 6. The angular and spatial positions are measured with the adjustment apparatus 24. In the example of the AKF, this can be done in two measurement operations. The acquired measurement data relating to the spatial position or angular position can be transmitted to an evaluation unit 25 via a detector 27 connected to the adjustment apparatus 24, for example a CCD camera.

Necessary adjustments of the adjustable optical elements, in this exemplary embodiment the optical lens 2 and the plane plate 5, can be displayed, and manual settings can then be made. Alternatively, the evaluation unit 25 can be configured in such a way that control commands are generated in dependence on the measurement data and transmitted to an actuating apparatus 26 or to a plurality of actuating apparatuses 26. The adjustable optical elements are adjusted according to the control commands. This operation can take place iteratively and be carried out in the sense of a feedback control.

If the acquired measurement data are within permissible tolerances, the adjustment operation is ended. The adjustable optical elements and optionally also the ferrule 10 are locked, optionally non-releasably, by being glued, potted, soldered or welded, for example. The ferrule 10 can also be retained in its installed position by means of the clamping element 20. This embodiment allows the fiber 1 to be reused in the case of a defect in the fiber plug 7.

Figure 13:
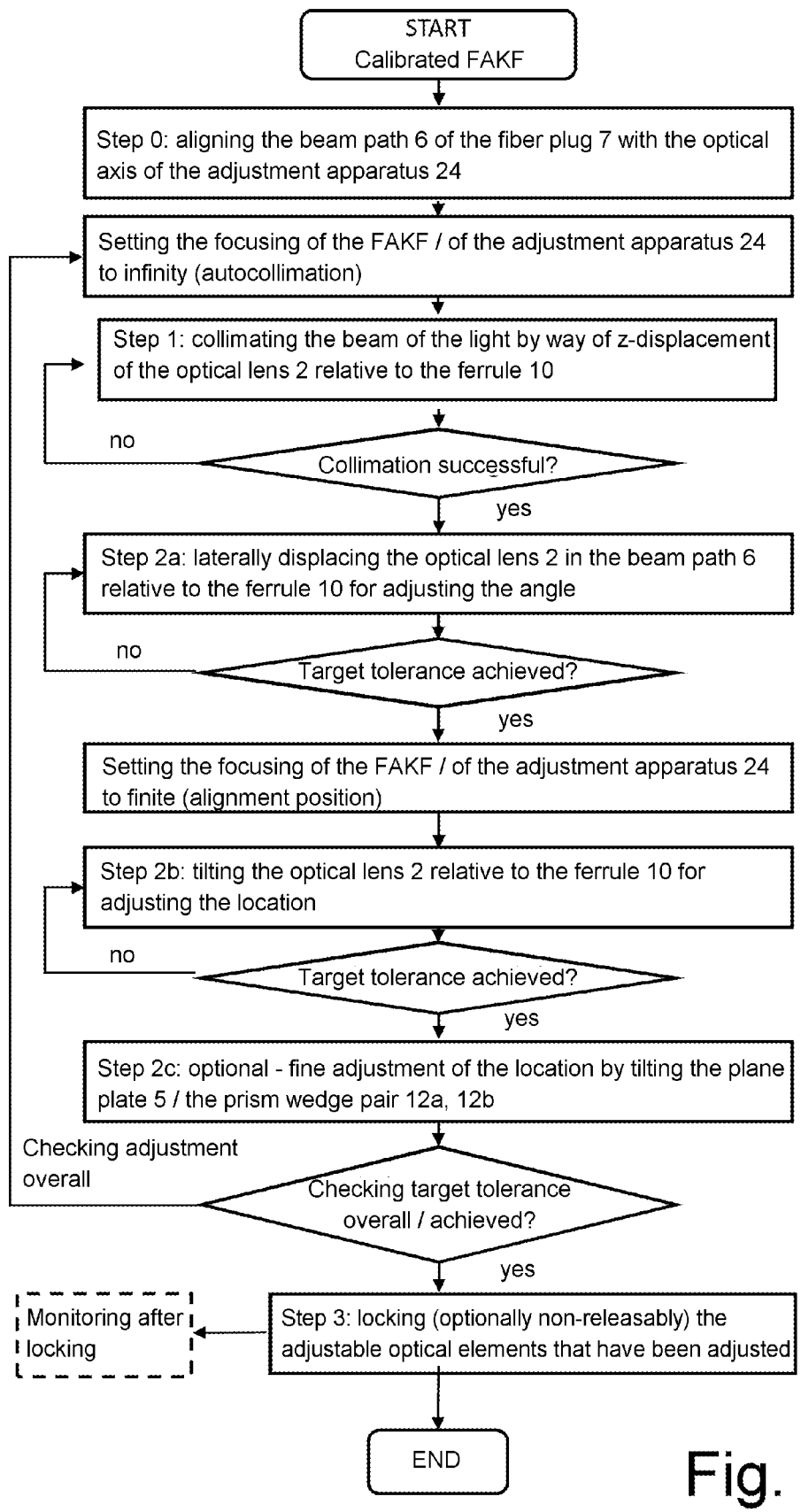
FIG. 13 shows a flow chart of a configuration of an adjustment method.

In a flow chart of the method, the fiber plug 7 and its beam path 6 are aligned relative to an adjustment apparatus 24 (FIG. 13; step 0). The adjustment apparatus 24 can have two beam paths with a reference mark for setting an angle in one beam path and a reference mark for setting a location in the other beam path. In the exemplary configuration of the adjustment method explained below, reference is made to an alternative possibility in the form of an FAKF. The FAKF is refocused accordingly for the purpose of adjusting the angle or the location.

The focusing of the FAKF or the adjustment apparatus 24 is set to infinity. This corresponds to the functional principle of an autocollimation telescope.

In a step 1 of the method, light exiting the fiber 1 divergently in a beam is aligned as symmetrically as possible with respect to the beam path 6 of the fiber plug 7. The beam path 6 of the fiber plug 7 is aligned with the optical axis of the adjustment apparatus 24, with the result that the beam path 6 and the optical axis of the adjustment apparatus 24 coincide.

The optical lens 2 is subsequently positioned in relation to the beam. By displacing the optical lens 2 and/or ferrule 10 relative to one another in the beam direction (z-direction), the beam is collimated by the effect of the optical lens 2. The success of the collimation is checked. Step 1 is repeated if the collimation was unsuccessful.

If the collimation was successful, the angle of the beam is set in a step 2a by laterally displacing the optical lens 2 relative to the ferrule 10 (see also FIG. 1a). The respective changes in the measured angle can be related to a current change in position of the optical lens 2, and the setting can be effected iteratively. Step 2a is repeated as long as a specified target tolerance has not been achieved.

If, on the other hand, the target tolerance has been achieved, the focusing of the FAKF or of the adjustment apparatus 24 is set to finite (alignment position).

Figure 1B:
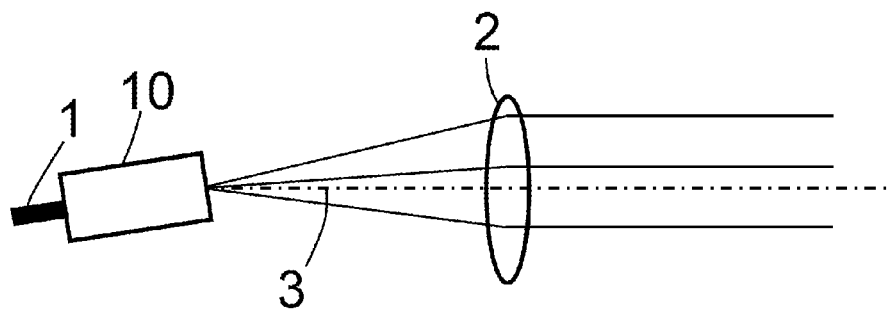
FIG. 1b shows a schematic illustration of a resulting spatial offset.

Once the setting of the angle has been completed, the optical lens 2 is tilted relative to the ferrule 10 in a step 2b in order to set the desired spatial position of the collimated beam (see also FIG. 1b). This adjustment of the location is comparatively coarse. If, in addition to the optical lens 2, a plane plate 5 or a prism wedge pair 12a, 12b is also located in the beam path 6, tilting it can finely adjust the location. As explained above in relation to angle adjustment, the adjustment of the location can also take place iteratively, that is, the achievement of a target tolerance is checked. Depending on the result of the check, step 2b is repeated, or the method continues with step 2c.

Step 2c is optional and includes a fine adjustment of the location. For this purpose, the plane plate 5, the pivot wedge pair 28 and/or the prism wedge pair 12a, 12b is/are tilted.

In order to evaluate the result of the previous adjustment steps, the achievement of a previously defined target tolerance is checked again. If the target tolerance is not achieved, the adjustment operation is repeated beginning with the setting of the focusing of the FAKF/adjustment apparatus 24 to infinity (autocollimation, between step 0 and step 1).

If the target tolerance of the entire adjustment process is achieved, the method continues with step 3. In step 3, the adjustable optical elements are locked in the state adjusted in this way. The locking can be done either releasably or non-releasably. A fiber plug 7 adjusted in this way can be connected to different plug receptacles 16 once or repeatedly. The correct alignment of the beam of light provided at the output 9 of the fiber plug 7 and, for example, irradiated into a microscope is maintained in this case. Monitoring of the adjustment is advantageously carried out in the now locked state of the fiber plug 7.

REFERENCE SIGNS

1 Fiber
2 Optical lens
3 Optical axis (of the optical lens)
4 Prism wedge
5 Plane plate
6 Beam path (of the fiber plug 7)
7 Fiber plug
8 Plug housing
9 Output (beam path 6)
10 Ferrule
11 Fiber bearing
12a Prism wedge pair
12b Prism wedge pair in a common mount
13 Coupling surface
14 Coupling structure
15 Receptacle structure
16 Plug receptacle
17 Interface
17.1 Microscope
18 Magnetic coupling
18.1 First component
18.2 Second component
19 Kinematic coupling
19.1 First component
19.2 Second component
20 Clamping element
21 Non-releasable lock
22 Recess (for force-free screw-connection)
23 Passage
24 Adjustment apparatus
25 Evaluation unit
26 Actuating apparatus
27 Detector
28 Pivot wedge pair
28.1 First lens 28.2 Second lens
29 Fastening holes
30 Beam path (of plug receptacle 16)

The invention claimed is:

1. A fiber plug for optical coupling of a light-guiding fiber with a plug receptacle, the fiber plug comprising:
a plug housing for receiving and locking component parts of the fiber plug in a predetermined position relative to one another; wherein the plug housing includes:
a fiber inlet and a fiber bearing configured for spatially fixed reception of the light-guiding fiber;
at least one optical lens located optically downstream of the fiber bearing along a beam path of light emitted from an end face of the light-guiding fiber and configured for collecting light exiting from the end face of the light-guiding fiber and for collimating the collected light;
a coupling surface with an output of the beam path and with a coupling structure for connection to a receptacle structure, which is complementary to the coupling structure; and
at least one adjustable optical element that is arranged in the beam path optically downsteam of the fiber bearing and optically upstream of the coupling surface, wherein the at least one adjustable optical element is configured to reduce an angle of the beam path with respect to an optical axis of the lens and/or to reduce a spatial offset of the beam path with respect to the optical axis of the optical lens,
wherein the coupling structure has a first component of a magnetic coupling that includes two components and a first component of a kinematic coupling.

2. The fiber plug according to claim 1, wherein the at least one adjustable optical element includes a prism wedge pair having two mutually adjustable prism wedges arranged in a common mount and wherein the prism wedge pair is tiltable about a plurality of axes.

3. The fiber plug according to claim 1, wherein the at least one adjustable optical element includes a pivot wedge pair that includes two lenses whose side surfaces facing away from one another include planar surfaces and wherein the lenses can be inclined relative to one another and/or displaced laterally.

4. The fiber plug according to claim 1, wherein the optical lens is corrected achromatically to a spectral range or wavelength range intended for use.

5. The fiber plug according to claim 1, wherein the at least one adjustable optical element includes at least one plane-parallel plate.

6. The fiber plug according to claim 5, further comprising a further plane-parallel plate and/or a pair of mutually adjustable prism wedges arranged in the beam path.

7. The fiber plug according to claim 1, wherein the fiber bearing is configured for retaining a light-guiding fiber having a light exit surface directed along the beam path.

8. The fiber plug according to claim 1, wherein the fiber bearing includes a clamping element configured for receiving and retaining a fiber.

9. The fiber plug according to claim 7, wherein the at least one adjustable optical element is configured to be adjusted such that light exiting the fiber is provided at an optical output of the fiber plug parallel and symmetrically with respect to the beam path at the optical output; and wherein the at least one adjustable optical element is locked in a state adjusted in this way.

10. An optical plug connector comprising:
a fiber plug that includes:
a plug housing for receiving and locking component parts of the fiber plug in a predetermined position relative to one another; wherein the plug housing includes:
a fiber inlet and a fiber bearing for the spatially fixed reception of the light-guiding fiber;
at least one optical lens located optically downstream of the fiber bearing along a beam path of light emitted from an end face of the light-guiding fiber and configured for collecting light exiting from the end face of the light-guiding fiber and for collimating the collected light;
a coupling surface with an output of the beam path and with a coupling structure for connection to a receptacle structure, which is complementary to the coupling structure; and
at least one adjustable optical element that is arranged in the beam path optically downsteam of the fiber bearing and optically upstream of the coupling surface, wherein the at least one adjustable optical element is configured to reduce an angle of the beam path with respect to an optical axis of the lens and/or to reduce a spatial offset of the beam path with respect to the optical axis of the optical lens,
wherein the coupling structure includes a first component of a magnetic coupling and a first component of a kinematic coupling; and
a plug receptacle that includes:
a second component of the kinematic coupling, which is complementary to the first component of the kinematic coupling, as a receptacle structure; and
a second component of the magnetic coupling that includes two components.

11. The optical plug connector according to claim 10, the adjustable optical element includes a prism wedge pair with two mutually adjustable prism wedges arranged in a common mount and wherein the jointly held prism wedge pair is tiltable about a plurality of axes.

12. The optical plug connector according to claim 10, wherein the adjustable optical element includes a pivot wedge pair, which comprises two lenses whose side surfaces facing away from one another include planar surfaces and wherein the lenses can be inclined relative to one another and/or displaced laterally.

13. The optical plug connector according to claim 10, wherein the at least one optical lens is corrected achromatically to a spectral range or wavelength range intended for use.

14. The optical plug connector according to claim 10, wherein the adjustable optical element includes at least one plane-parallel plate is arranged.

15. The optical plug connector according to claim 14, further comprising a further plane-parallel plate and/or a pair of mutually adjustable prism wedges arranged in the beam path.

16. The optical plug connector according to claim 10, wherein the fiber bearing is configured for retaining a light-guiding fiber having a light exit surface directed along the beam path.

17. The optical plug connector according to claim 10, wherein the fiber bearing includes a clamping element configured for retaining a fiber received in the fiber bearing.

* * * * *

UNITED STATES PATENT AND TRADEMARK OFFICE
CERTIFICATE OF CORRECTION

| | | |
|---|---|---|
| PATENT NO. | : 11,693,198 B2 | |
| APPLICATION NO. | : 17/445919 | |
| DATED | : July 4, 2023 | |
| INVENTOR(S) | : Wilhelm et al. | |

It is certified that error appears in the above-identified patent and that said Letters Patent is hereby corrected as shown below:

In the Claims

In Column 15, Claim 1, Line 24, delete "downsteam" and insert -- downstream --, therefor.

In Column 16, Claim 10, Line 20, delete "downsteam" and insert -- downstream --, therefor.

In Column 16, Claim 11, Line 36, after "10,", insert -- wherein --.

Signed and Sealed this
Second Day of January, 2024

Katherine Kelly Vidal
*Director of the United States Patent and Trademark Office*